(12) United States Patent
Zheng et al.

(10) Patent No.: US 11,329,949 B2
(45) Date of Patent: May 10, 2022

(54) DOMAIN NAME PARSING METHOD, DOMAIN NAME PARSING DEVICE AND STORAGE MEDIUM

(71) Applicant: BEIJING XIAOMI MOBILE SOFTWARE CO., LTD., Beijing (CN)

(72) Inventors: Yanqiang Zheng, Beijing (CN); Bin Zhu, Beijing (CN); Weijun Gong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 78 days.

(21) Appl. No.: 16/848,125

(22) Filed: Apr. 14, 2020

(65) Prior Publication Data
US 2021/0126896 A1    Apr. 29, 2021

(30) Foreign Application Priority Data
Oct. 24, 2019   (CN) .......................... 201911019109.9

(51) Int. Cl.
*H04L 61/5046*    (2022.01)
*H04L 61/4511*    (2022.01)
(Continued)

(52) U.S. Cl.
CPC .......... *H04L 61/2046* (2013.01); *H04L 61/10* (2013.01); *H04L 61/1511* (2013.01);
(Continued)

(58) Field of Classification Search
CPC . H04L 61/10; H04L 61/1511; H04L 61/2046; H04L 61/3025; H04L 61/609; H04L 63/0236
See application file for complete search history.

(56) References Cited

U.S. PATENT DOCUMENTS 7,536,458 B2    5/2009  Teodosiu et al.
7,991,910 B2 *  8/2011  Richardson ....... H04L 29/12066
                                              709/238
(Continued)

FOREIGN PATENT DOCUMENTS

CN    104253873 A    12/2014
WO    2019165665 A1   9/2019

OTHER PUBLICATIONS

Extended European Search Report in Application No. 20172940, dated Sep. 17, 2020.
(Continued)

*Primary Examiner* — George C Neurauter, Jr.
(74) *Attorney, Agent, or Firm* — Syncoda LLC; Feng Ma

(57) ABSTRACT

A domain name parsing method, includes the following steps: acquiring a domain name parsing request transmitted by a client containing a domain name and home information of the client; inquiring a correspondence between the domain name and an address corresponding to a region to which the client belongs in pre-stored statistical information based on the home information; and determining and transmitting the domain name parsing address corresponding to the domain name included in the inquiring request based on the correspondence between the domain name and the address corresponding to the region. The statistical information includes a correspondence between the domain name and an address counted previously for various regions, and the correspondence represents a corresponding relationship between the domain name and a domain name available parsing address determined based on history report information from a plurality of clients and capable of assessing the domain name successfully.

12 Claims, 6 Drawing Sheets

(51) Int. Cl.
*H04L 9/40* (2022.01)
*H04L 61/10* (2022.01)
*H04L 61/3015* (2022.01)
*H04L 101/69* (2022.01)
*H04L 29/06* (2006.01)

(52) U.S. Cl.
CPC ........ *H04L 61/3025* (2013.01); *H04L 61/609* (2013.01); *H04L 63/0236* (2013.01)

(56) References Cited

U.S. PATENT DOCUMENTS

| | | | | |
|---|---|---|---|---|
| 8,234,403 | B2* | 7/2012 | Richardson | H04L 67/18 709/238 |
| 8,423,667 | B2* | 4/2013 | Richardson | H04L 69/40 709/242 |
| 9,021,127 | B2* | 4/2015 | Richardson | H04L 69/40 709/238 |
| 9,197,487 | B2* | 11/2015 | James | H04L 41/00 |
| 9,565,157 | B2* | 2/2017 | Chhabra | H04L 61/1552 |
| 9,742,811 | B2* | 8/2017 | Lemon | H04L 63/0263 |
| 9,992,234 | B2* | 6/2018 | Lemon | H04L 63/102 |
| 10,027,582 | B2* | 7/2018 | Richardson | H04L 29/12066 |
| 10,084,746 | B2* | 9/2018 | James | H04L 47/10 |
| 10,142,291 | B2* | 11/2018 | Lemon | G06F 21/6263 |
| 10,721,117 | B2* | 7/2020 | Kaliski, Jr. | H04W 24/04 |
| 10,742,550 | B2* | 8/2020 | Richardson | H04L 61/1511 |
| 11,025,482 | B2* | 6/2021 | Huque | H04L 61/2076 |
| 11,032,127 | B2* | 6/2021 | Huque | H04L 69/40 |
| 2010/0125675 | A1* | 5/2010 | Richardson | H04L 61/15 709/242 |
| 2015/0134730 | A1* | 5/2015 | Seedorf | H04L 67/42 709/203 |
| 2017/0222974 | A1* | 8/2017 | Cathrow | H04L 61/1511 |
| 2018/0013716 | A1* | 1/2018 | Connell | H04L 67/18 |
| 2018/0375714 | A1* | 12/2018 | Kaliski, Jr. | H04L 61/2076 |
| 2019/0199790 | A1 | 6/2019 | Yang et al. | |
| 2020/0076763 | A1* | 3/2020 | Elsloo | H04L 61/1511 |
| 2020/0076766 | A1* | 3/2020 | Maslak | H04L 45/7453 |
| 2020/0195669 | A1* | 6/2020 | Karasaridis | H04L 41/142 |

OTHER PUBLICATIONS

"Client Subnet in DNS Queries" in Internet Engineering Task Force, Category INFORMATIONAL by Contavalli, et al., ISSN: 2070-1721, May 20, 2016.

"Client IP information in DNS requests draft-vandergaast-edns-client-ip-01" in dnsext, Internet-Draft, by Contavalli, et al., May 21, 2010.

* cited by examiner

DOMAIN NAME PARSING METHOD, DOMAIN NAME PARSING DEVICE AND STORAGE MEDIUM

CROSS-REFERENCE TO RELATED APPLICATION

This disclosure claims priority to Chinese Patent Application No. 201911019109.9, filed on Oct. 24, 2019, the disclosure of which is hereby incorporated by reference in its entirety.

BACKGROUND

When it is required by a client to assess a network, a domain name is required to be parsed with a Domain Name System (DNS) after the domain name is entered into a browser, and as long as an Internet Protocol (IP) address corresponding to the domain name is parsed, the client is enabled to assess network contents corresponding to the IP address. Parsing the domain name with the DNS can be a complicated process.

SUMMARY

The present disclosure relates generally to a field of computer technologies, and more specifically to a domain name parsing method, a domain name parsing apparatus and a storage medium.

According to a first aspect of embodiments of the present disclosure, there is provided a domain name parsing method applied to a server, the domain name parsing method includes: acquiring a domain name parsing request transmitted by a client, the domain name parsing request including a domain name and home information of the client; inquiring a correspondence between a domain name and an address corresponding to a region to which the client belongs in pre-stored statistical information, based on the home information; the statistical information including a correspondence between a domain name and an address counted previously for various regions, the correspondence between a domain name and an address representing a corresponding relationship between a domain name and a domain name available parsing address which is a domain name parsing address determined based on history report information from a plurality of clients and capable of assessing the domain name successfully; determining and transmitting the domain name parsing address corresponding to the domain name included in inquiring request, based on the correspondence between the domain name and the address corresponding to the region.

In an example, the domain name parsing method further includes determining the statistical information previously by adopting the following modes: acquiring respectively information reported by each of the plurality of clients within a designated historical period, the information including the home information, the domain name, the domain name parsing address and a parsing result representing whether assessing of the domain name based on the domain name parsing address is successful or not; determining the regions to which homes corresponding to the home information reported by the respective clients belong; counting the domain name available parsing address for each domain name, based on the domain name, the domain name parsing address and the parsing result, for each region; and establishing the correspondence between the domain name and the domain name parsing address to obtain the correspondence between the domain name and the address for the various regions.

In an example, counting the domain name available parsing address for each domain name includes counting periodically and updating the domain name available parsing address for the each domain name in a designated time unit.

In an example, the domain name available parsing address is a domain name parsing address capable of accessing the domain name successfully and having an access time less than a predetermined time threshold when accessing the domain name.

In an example, determining the domain name parsing address corresponding to the domain name included in the inquiring request based on the correspondence between the domain name and the address corresponding to the region includes: determining a predetermined number of acquired domain name available parsing addresses as the domain name parsing address corresponding to the domain name included in the inquiring request in an ascending order of time consuming.

In an example, acquiring the information reported by each of the plurality of clients respectively includes: acquiring the information reported by each of the plurality of clients respectively, based on private encryption protocols between each of the plurality of clients and the server.

In an example, acquiring the domain name parsing request transmitted by the client includes: acquiring the domain name parsing request transmitted by the client based on a private encryption protocol corresponding to the client transmitting the domain name parsing request.

According to a second aspect of embodiments of the present disclosure, there is provided a domain name parsing method applied to a client, including: transmitting a domain name parsing request including a domain name and home information of the client; receiving a domain name parsing address corresponding to the domain name transmitted by the server, the domain name parsing address being determined by the server based on the home information, the domain name and pre-stored statistical information; the statistical information including a correspondence between a domain name and an address counted previously for various regions, the correspondence between a domain name and an address representing a corresponding relationship between the domain name and a domain name available parsing address which is a domain name parsing address determined based on history report information from a plurality of clients and capable of assessing the domain name successfully.

In an example, before transmitting the domain name parsing request, the domain name parsing method further includes: determining that the domain name parsing is failed on a local DNS server.

In an example, the domain name parsing method further includes: reporting information in real time, the information including the home information, the domain name, the domain name parsing address and a parsing result representing whether accessing of the domain name based on the domain name parsing address is successful.

In an example, the transmitting the domain name request includes transmitting the domain name parsing request based on a private encryption protocol between the client and the server.

In an example, the reporting information includes reporting information based on a private encryption protocol between the client and the server.

According to a third aspect of embodiments of the present disclosure, there is provided a domain name parsing apparatus applied to a server, including: an acquiring unit configured to acquire a domain name parsing request transmitted by a client, the domain name parsing request including a domain name and home information of the client; an inquiring unit configured to inquire a correspondence between a domain name and an address corresponding to a region to which the client belongs in pre-stored statistical information based on the home information, the statistical information includes a correspondence between a domain name and an address counted previously for various regions, the correspondence between a domain name and an address representing a corresponding relationship between the domain name and a domain name available parsing address which is a domain name parsing address determined based on history report information from a plurality of clients and capable of assessing the domain name successfully; a determination unit configured to determine the domain name parsing address corresponding to the domain name included in the inquiring request, based on the correspondence between the domain name and the address corresponding to the region; and a transmitting unit configured to transmit the domain name parsing address corresponding to the domain name included in the inquiring request.

In an example, the acquiring unit is further configured to: acquire respectively information reported by each of the plurality of clients within a designated historical period, the information including the home information, the domain name, the domain name parsing address and a parsing result representing whether assessing of the domain name based on the domain name parsing address is successful or not; the determination unit is configured to determine the statistical information previously by adopting the following mode: determining the regions belonging to home corresponding to the home information reported by the respective clients; for each region, the domain name available parsing address is counted for the each domain name based on the domain name, the domain name parsing address and the parsing result, and the correspondence between the domain name and the domain name parsing address is established to obtain the correspondence between a domain name and an address for the various regions.

In an example, the determination unit is configured to count the domain name available parsing address for each domain name statistically by adopting the following mode: counting periodically and updating the domain name available parsing address for the each domain name in a designated time unit.

In an example, the domain name available parsing address is a domain name parsing address capable of accessing the domain name successfully and having an access time less than a predetermined time threshold when accessing the domain name.

In an example, the determination unit is configured to determine the domain name parsing address corresponding to the domain name included in the inquiring request by adopting the following mode: determining a predetermined number of acquired domain name available parsing addresses as the domain name parsing address corresponding to the domain name included in the inquiring request in ascending order of time consuming, based on the correspondence between a domain name and an address corresponding to the region.

In an example, the acquiring unit is configured to acquire the information reported by each of the plurality of clients respectively by adopting the following mode: acquiring the information reported by each of the plurality of clients respectively, based on private encryption protocols between each of the plurality of clients and the server.

In an example, the acquiring unit is configured to acquires the domain name parsing request transmitted from the client by adopting the following mode: acquiring the domain name parsing request transmitted by the client based on a private encryption protocol corresponding to the client transmitting the domain name parsing request.

According to a fourth aspect of embodiments of the present disclosure, there is provided a domain name parsing apparatus applied to a client, including: a transmitting unit configured to transmit a domain name parsing request including a domain name and home information of the client; a receiving unit configured to receive a domain name parsing address corresponding to the domain name transmitted by a server, the domain name parsing address being determined by the server based on the home information, the domain name and pre-stored statistical information; and the statistical information including a correspondence between a domain name and an address counted statistically and previously for various regions, the correspondence between a domain name and an address representing a corresponding relationship between the domain name and a domain name available parsing address which is a domain name parsing address determined based on history report information from a plurality of clients and capable of assessing the domain name successfully.

In an example, the domain name parsing apparatus further includes; a determination parsing unit, configured to determine that the domain name parsing is failed on a local DNS server, before transmitting the domain name parsing request.

In an example, the domain name parsing apparatus further includes: a report unit configured to report information in real time, the information including the home information, the domain name, the domain name parsing address and a parsing result representing whether accessing of the domain name based on the domain name parsing address is successful.

In an example, the transmitting unit is configured to transmit the domain name parsing request by adopting the following mode: transmitting the domain name parsing request based on a private encryption protocol between the client and the server.

In an example, the reporting unit reports information by adopting the following mode: reporting information based on a private encryption protocol between the client and the server.

According to a fifth aspect of the embodiments of the present disclosure, there is provided a non-transitory computer-readable storage medium having computer executable instructions stored thereon, which perform, as executed by a processor, the any one of the methods described above According to the sixth aspect of the embodiments of the present disclosure, there is provided a domain name parsing apparatus, including a processor; and a memory for storing processor executable instructions. Wherein the process is configured to invoke the instructions to perform any one of the methods described above.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure.

DETAILED DESCRIPTION

Figure 1:
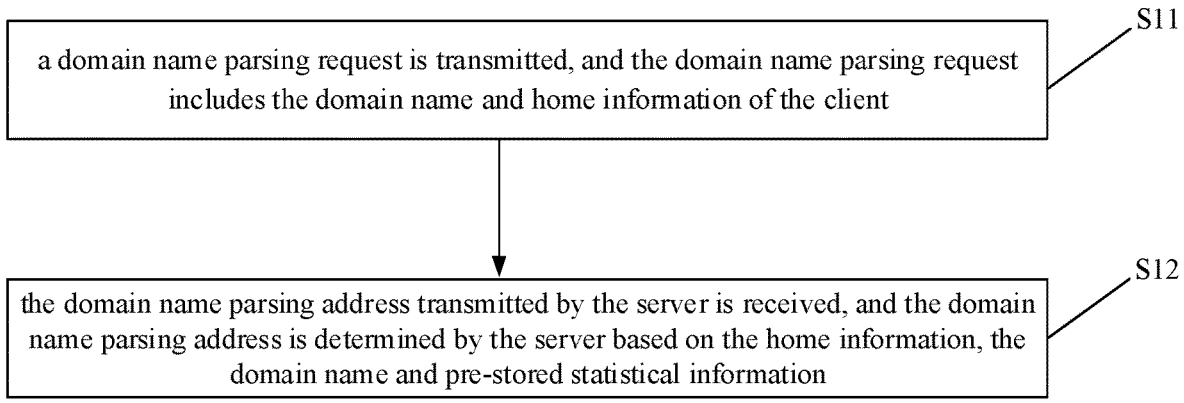
FIG. 1 is a flowchart illustrating a domain name parsing method, according to some embodiments.

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It is possible for the technical solutions according to exemplary embodiments of the present disclosure to be applied to application scenarios where a domain name is parsed in a procedure of accessing a network by a client.

In related technologies, a way to parse the domain name is as follows: when entering the domain name to access the network, the client parses the domain name through a local DNS allocated by an Internet Service Provider (ISP) at first. The local DNS server inquires a buffer record regarding the domain name, and returns an IP address corresponding to the domain name directly if there is the buffer record for the entered domain name in the buffer of the local DNS server. If there is no buffer record for the domain name in the buffer of the local DNS server, the local DNS server would inquire to a DNS root server. According to the inquiring request from the local DNS server, the DNS root server returns a result that the local DNS server needs to continue inquiring to a domain server and gives an address of the domain server. The local DNS server continues to make requests to the domain server, and the domain server returns an address of a parsing server for parsing the domain name to the local DNS server according to the inquiring request from the local DNS server. The local DNS server issues a inquiring request to the parsing server for parsing domain name, and, the parsing server returns a correspondence between the domain name and an IP address according to the inquiring request from the local DNS server. The local DNS server returns the acquired IP address corresponding to the domain name to the client, to achieve the accessing to contents on the network corresponding to the IP address by the client. There are many intermediate links in parsing the domain name with the DNS, and an abnormal parsing may occur as long as there is a problem in any link, which affects user access to the network.

In the related technologies, another way to parse the domain name is to acquire via the DNS service provided by a third party. After entering the domain name in a browser, the IP address corresponding to the domain name is inquired via the DNS service provided by the third party. During a procedure of acquiring the IP address corresponding to the domain name through data provided by the third party, a communication between the client and the DNS service of the third party may be attacked, which results in the acquired IP address to be tampered. Or the DNS service data provided by the third party is not updated in time, such that the DNS domain name parsing fails.

In view of this, the present disclosure provides a domain name parsing method, to reduce the links of the domain name parsing and increase a success rate of the domain name parsing.

FIG. 1 is the flowchart illustrating a domain name parsing method, according to some embodiments. Referring to FIG. 1, the domain name parsing method is applied to the client and includes the following steps.

In step S11, a domain name parsing request is transmitted, and the domain name parsing request includes the domain name and home information of the client.

In some embodiments of the present disclosure, the client can transmit the domain name parsing request to a server side, and the domain name parsing request includes the domain name and the home information of the client.

In some embodiments of the present disclosure, an IP address of the client can be transmitted as the home information of the client.

In some embodiments of the present disclosure, a region to which the client belongs and an ISP of the belonged region can also be transmitted as the home information of the client.

In an implementation of the present disclosure, in order to ensure a safety communication between the client and the server, and prevent a transmission channel between the client and the server from being hacked, the client can transmit the domain name parsing request based on a private encryption protocol between the client and the server. For example, the client transmits, by the private encryption protocol, the domain name parsing request to the server via an inquiring interface set in the server. The server can transmit, to the client, a domain name parsing address corresponding to the domain name in the domain name parsing request via the inquiring interface, according to the private encryption protocol between the server and the client.

In step S12, the domain name parsing address transmitted by the server is received, and the domain name parsing address is determined by the server based on the home information, the domain name and pre-stored statistical information.

In some embodiments of the present disclosure, the client receives the domain name parses address corresponding to the domain name transmitted by the server. The domain name parsing address can be determined by the server based on the home information of the client, the domain name and the pre-stored statistical information.

Herein, the pre-stored statistical information includes a correspondence between a domain name and an address counted previously for various regions, the correspondence between a domain name and an address represents a corresponding relationship between the domain name and a domain name available parsing address which is a domain name parsing address determined based on history report information from a plurality of clients and capable of assessing the domain name successfully.

In an implementation, if the client transmits the IP address of the client as the home information of the client to the server, the server can determine the region to which the client belongs and the ISP of the belonged region based on the IP address of the client. The server acquires the domain name parsing address corresponding to the region to which the client belongs by parsing, according to the region to which the client belongs and the ISP of the belonged region, and the pre-stored statistical information including the region to which the client belongs, the ISP of the belonged region and the correspondence between a domain name and an address, and transmits the domain name parsing address acquired by parsing to the client.

In some embodiments of the present disclosure, the client transmits the domain name parsing request to the server, and the server parses the domain name transmitted by the client according to the pre-stored correspondence between a domain name and an address counted previously for various regions, and transmits the parsed domain name parsing address to the client. The correspondence between a domain name and an address pre-stored in the server represents the corresponding relationship between the domain name and the domain name available parsing address which is a domain name parsing address capable of assessing the domain name successfully. The client receives the domain name parsing address corresponding to the domain name transmitted by the server, thereby the intermediate links of the domain name parsing can be reduced and the efficiency of the domain name paring can be raised.

Figure 2:
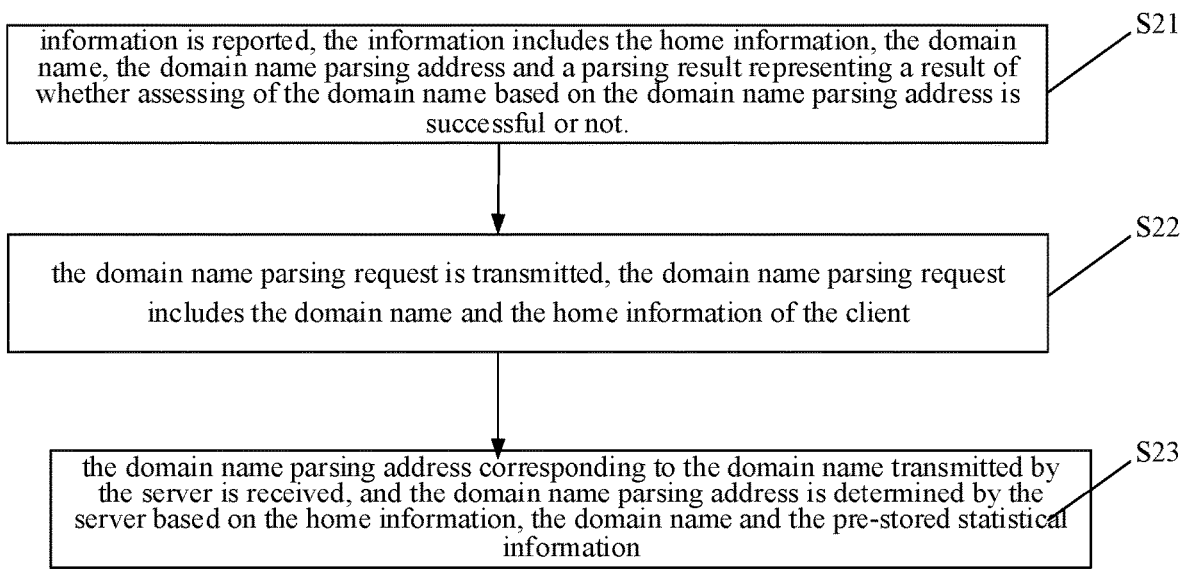
FIG. 2 is a flowchart illustrating a domain name parsing method, according to some embodiments.

FIG. 2 is the flowchart illustrating a domain name parsing method, according to some embodiments. As illustrated in FIG. 2, the domain name parsing method is applied to the client and includes following steps.

In step S21, information is reported, the information includes the home information, the domain name, the domain name parsing address and a parsing result representing whether assessing of the domain name based on the domain name parsing address is successful or not.

In some embodiments of the present disclosure, information is reported by the client after the domain name is parsed by the local DNS server. The information reported by the client can include the home information of the client, the domain name, the domain name parsing address and the parsing result. The parsing result can be a result representing whether the assessing of the domain name based on the domain name parsing address is successful or not.

Herein, the home information of the client can be the home of the client determined based on the IP address of the client. The domain name can be a domain name to be parsed, and the parsing result of the domain name can include a parsing successful result, and can also include a parsing failure result for the domain name. When the domain name is parsed successfully, the domain name parsing address can be a domain name parsing address capable of accessing the domain name successfully. When the domain name is parsed in failure, the domain name parsing address can be a domain name parsing address unable to access the domain name successfully.

In some embodiments of the present disclosure, the client can report, in real-time, the information such as the home information, the domain name, the domain name parsing address and the parsing result, etc. Reporting in real time, by the client, the information such as the home information, the domain name, the domain name parsing address and the parsing result, etc. can enable the server to acquire real information that the domain name is parsed based on the client, and ensure effectiveness and timeliness that the server acquires the domain name parsing address corresponding to the domain name, thereby raising the success rate of parsing.

In an implementation of the present disclosure, in order to ensure a safety communication between the client and the server, and prevent a transmission channel between the client and the server from being hacked, the private encryption protocol is set in advance between the client and the server. The client can report the information based on the private encryption protocol between the client and the server. For example, the client can report the information, via a report interface of the server, through the private encryption protocol, and the server can acquire the information reported by each of the plurality of clients via the report interface, according to the private encryption protocol between the server and the client.

In step S22, the domain name parsing request is transmitted, the domain name parsing request includes the domain name and the home information of the client.

In step S23, the domain name parsing address corresponding to the domain name transmitted by the server is received, and the domain name parsing address is determined by the server based on the home information, the domain name and the pre-stored statistical information.

In some embodiments of the present disclosure, the domain name parsing information such as the home information, the domain name, the domain name parsing address, the parsing result and the like is reported, in real-time, to the server by the client. The server determines and stores the statistical information based on the information reported historically by the plurality of the clients. The pre-stored statistical information includes the correspondence between a domain name and an address counted previously for various regions, the correspondence between a domain name and an address represents the corresponding relationship between the domain name and the domain name available parsing address which is the domain name parsing address capable of assessing the domain name successfully. Reporting, by the client, the information such as the home information, the domain name, the domain name parsing address and the parsing result, etc. can enable the server to acquire real information that the domain name is parsed based on the client, and ensure effectiveness and timeliness that the server acquires the domain name parsing address corresponding to the domain name, thereby raising the success rate of parsing.

Figure 3:
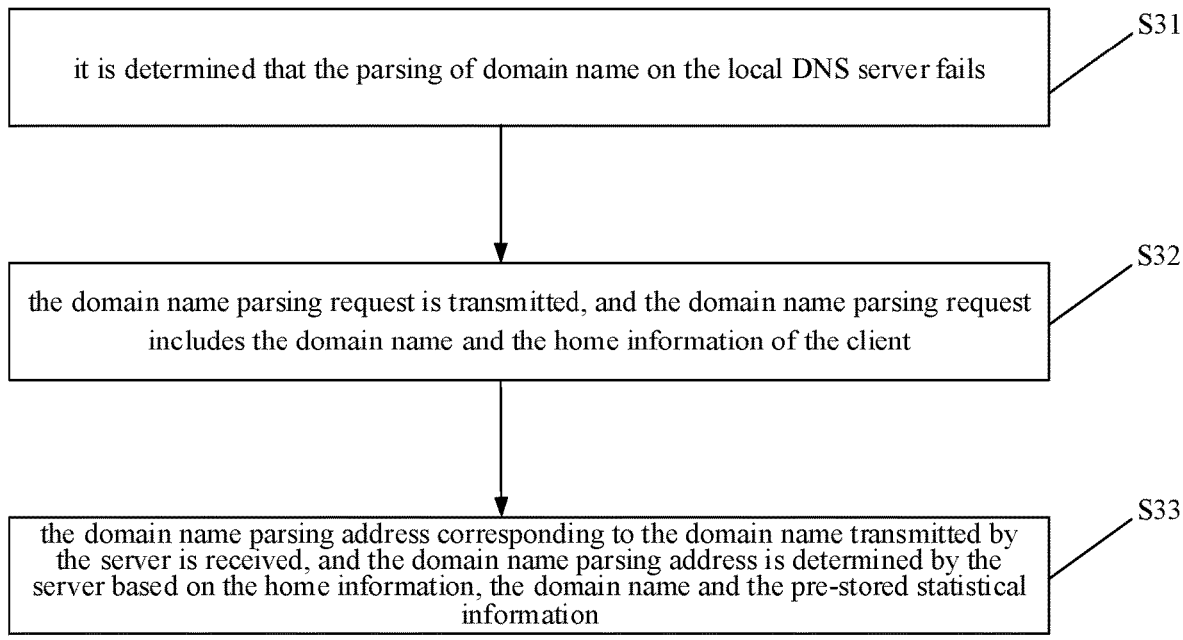
FIG. 3 is a flowchart illustrating a domain name parsing method, according to some embodiments.

FIG. 3 is the flowchart illustrating a domain name parsing method, according to some embodiments. As illustrated in FIG. 3, the domain name parsing method is applied to the client and includes following steps.

In step S31, it is determined that the parsing of domain name on the local DNS server fails.

In an implementation, some embodiments of the present disclosure can parse the domain name based on the local DNS server, and when the parsing of domain name on the local DNS server fails, it is request that the server parses the domain name.

In step S32, the domain name parsing request is transmitted, and the domain name parsing request includes the domain name and the home information of the client.

In step S33, the domain name parsing address corresponding to the domain name transmitted by the server is received, and the domain name parsing address is determined by the server based on the home information, the domain name and the pre-stored statistical information.

In some embodiments of the present disclosure, when the parsing of the domain name on the local DNS server fails, by transmitting the domain name parsing request to the server, the server can parse the domain name transmitted by the client according to the pre-stored correspondence between a domain name and an address counted previously for various regions, and transmits the parsed domain name parsing address to the client. The correspondence between a domain name and an address stored previously in the server represents the corresponding relationship between the domain name and the domain name available parsing address which is the domain name parsing address capable of assessing the domain name successfully. Thus, when the parsing on the local DNS server fails, it is avoided that the process of inquiring the domain name to the DNS root server by the local DNS server experiences a plurality of links of the parsing, which improves the parsing efficiency.

Figure 4:
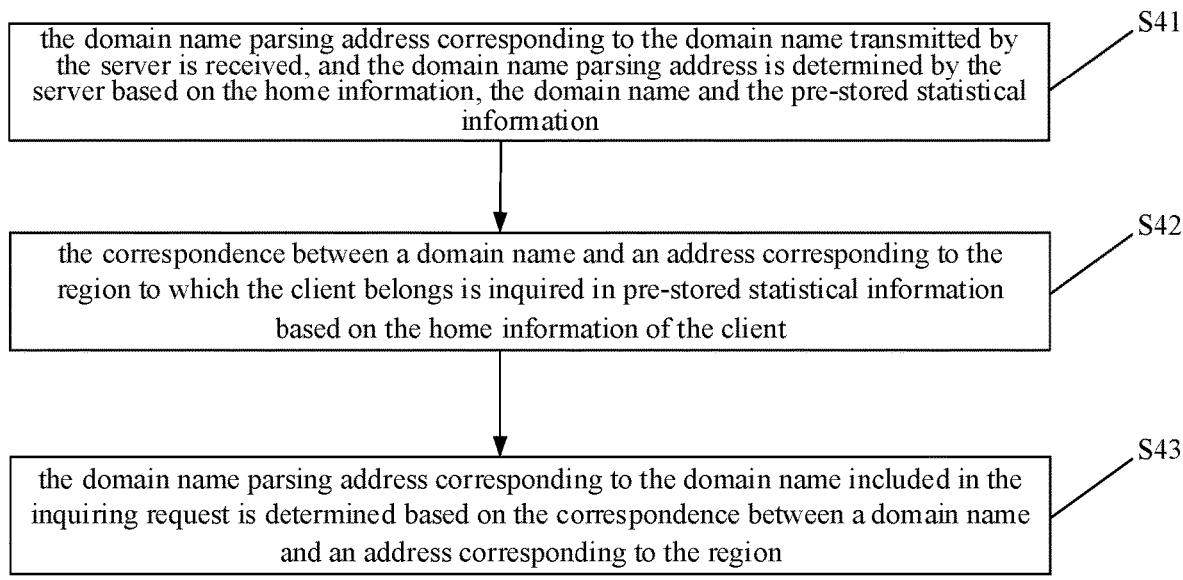
FIG. 4 is a flowchart illustrating a domain name parsing method, according to some embodiments.

FIG. 4 is the flowchart illustrating a domain name parsing method, according to some embodiments. As illustrated in FIG. 4, the domain name parsing method is applied to the client and includes following steps.

In step S41, the domain name parsing request transmitted by the client is acquired, and the domain name parsing request includes the domain name and the home information of the client.

In some embodiments of the present disclosure, the home information of the client can be information on the regions to which the client belongs. For example, the IP address of the client transmitted by the client can be used as the home information of the client in some embodiments of the present disclosure. Alternatively, the region to which the client belongs and the ISP of the belonged region transmitted by the client can also be used as the home information in some embodiments of the present disclosure.

In an implementation, in order to ensure a safety communication between the client and the server, and prevent a transmission channel between the client and the server from being hacked, the private encryption protocol is set in advance between the client and the server. The server acquires the domain name parsing request transmitted by the client based on the private encryption protocol between the client and the server. For example, the client transmits to the server the domain name parsing request via the interface on the server, for example via the inquire interface on the server, through the private encryption protocol. The server can acquire the domain name parsing request transmitted by the client via the inquire interface according to the private encryption protocol between the server and the client.

In step S42, the correspondence between a domain name and an address corresponding to the region to which the client belongs is inquired in pre-stored statistical information based on the home information of the client.

In an implementation, if the client uses the IP address of the client as the home information of the client and transmits it to the server, the server can determine the region to which the client belongs and the ISP of the belonged region based on the home information of the client. The server inquires the correspondence between a domain name and an address corresponding to the region to which the client belongs in the pre-stored statistical information on the region to which the client belongs according to the region to which the client belongs and the ISP of the belonged region.

In some embodiments of the present disclosure, the pre-stored statistical information includes the correspondence between a domain name and an address counted previously for various regions. Herein, the correspondence between a domain name and an address represents the corresponding relationship between the domain name and a domain name available parsing address which is a domain name parsing address determined based on history report information from a plurality of clients and capable of assessing the domain name successfully.

In step S43, the domain name parsing address corresponding to the domain name included in the inquiring request is determined based on the correspondence between a domain name and an address corresponding to the region.

In some embodiments of the present disclosure, the domain name available parsing address corresponding to the inquired domain name can be determined based on the correspondence between a domain name and an address corresponding to the region to which the client belongs. The domain name available parsing address can be understood as the domain name parsing address capable of assessing the domain name successfully as accessing the domain name. Further, in order to increase efficiency of parsing the domain name and improve the success rate of parsing the domain name, some embodiments of the present disclosure can further determine the domain name available parsing address according to time taken for the client to access the domain name. For example, some embodiments of the present disclosure can set in advance a time threshold for determining the domain name available parsing address. The domain name parsing address which is able to access the domain name successfully and the accessing spends a time less than the time threshold set in advance could be used as the domain name available parsing address.

Furthermore, some embodiments of the present disclosure can determine a predetermined number of acquired domain name available parsing addresses as the domain name parsing address corresponding to the domain name included in the inquiring request in an ascending order of time consuming. For example, in the ascending order of time consuming, the domain name available parsing addresses with the predetermined number of 3 are used as the domain name available parsing address.

In some embodiments of the present disclosure, by acquiring the domain name parsing request transmitted by the client, and based on the home information of the client in the domain name parsing request, the server can inquire the domain name parsing address corresponding to the domain name in the pre-stored statistical information on the belonged region. With the present disclosure, the intermediate links in parsing the domain name could be reduced and the efficiency of parsing the domain name could be raised. Also, determining the predetermined number of acquired domain name available parsing addresses as the domain name parsing address corresponding to the domain name included in the inquiring request in an ascending order of time consuming can increase the efficiency of the domain name parsing. Further, the server acquires the domain name parsing request transmitted by the client based on the private encryption protocol between the server and the client, which can prevent the transmission channel between the client and the server from being hacked and ensure a security of acquiring the domain name parsing request by the server.

Figure 5:
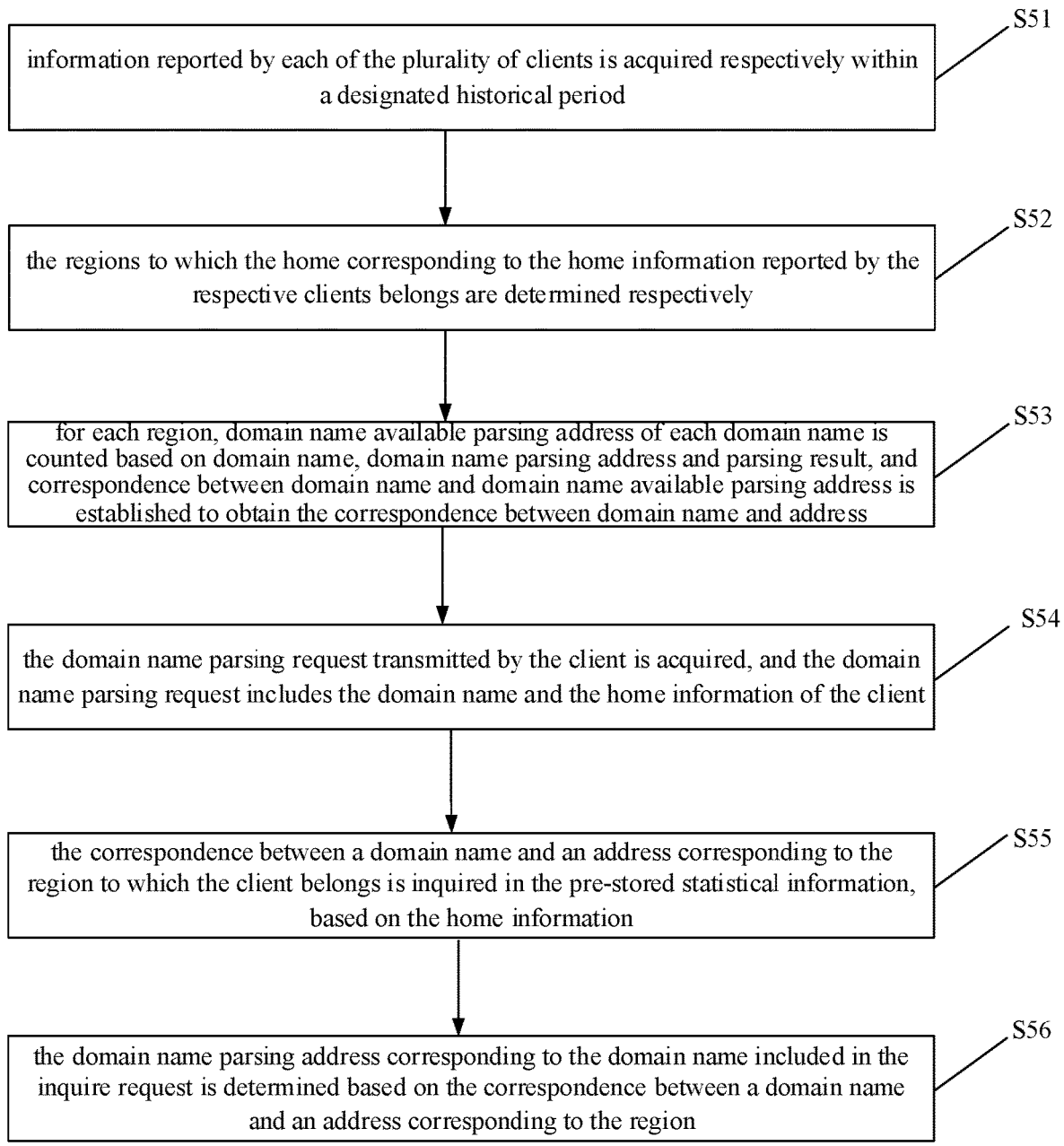
FIG. 5 is a flowchart illustrating a domain name parsing method, according to some embodiments.

FIG. 5 is the flowchart illustrating a domain name parsing method, according to some embodiments. As illustrated in FIG. 5, the domain name parsing method is applied to the server and includes following steps.

In step S51, information reported by each of the plurality of clients is acquired respectively within a designated historical period.

In some embodiments of the present disclosure, the designated historical period can be understood as a period before the current time, and can be set based on actual requirements. For example, it can be one day, one hour or one minute before the current time. In some embodiments of the present disclosure, the historical period can be set as one minute in order to ensure that the domain name parsing addresses capable of accessing the domain name successfully acquired for the various regions are the latest domain name parsing addresses.

The reported information can be information that the entered domain name is parsed and the situation of parsing is reported by the client. The reported information can include the home information of the client, the domain name, the domain name parsing address and the parsing result. The parsing result can be a result representing whether assessing of the domain name based on the domain name parsing address is successful or not. Herein, the home information of the client can be the home of the client determined based on the IP address information of the client. The domain name can be the domain name to be parsed, and the parsing result of the domain name can include a parsing successful result, and can also include a parsing failure result for the domain name. When the domain name is parsed successfully, the domain name parsing address can be the domain name parsing address capable of accessing the domain name successfully. When the domain name is parsed in failure, the domain name parsing address can be a domain name parsing address which is wrong and unable to access the domain name successfully.

In an implementation, in order to ensure a safety communication between the client and the server, and prevent a transmission channel between the client and the server from being hacked, in some embodiments of the present disclosure, the server acquires the information reported by each of the plurality of clients respectively based on the respective private encryption protocols between the each of the plurality of clients and the server. For example, the client reports the information via the interface on the server, such as a report interface on the server, to the server through the private encryption protocol. The server can acquire the information reported by the each of the plurality of clients via the report interface according to the private encryption protocol between the server and the clients.

In step S52, the regions to which the home corresponding to the home information reported by the respective clients belongs are determined respectively.

In some embodiments of the present disclosure, the home information of the clients is counted according to the information reported by the client in real-time, and the regions to which the respective client belong and the ISPs of the belonged regions are determined.

In step S53, for the each region, the domain name available parsing address of each domain name is counted based on the domain name, the domain name parsing address and the parsing result, and a correspondence between the domain name and the domain name available parsing address is established to obtain the correspondence between a domain name and an address.

In some embodiments of the present disclosure, the domain name available parsing address of the domain name in the each region is counted based on the domain name, the parsing result of the successful domain name parsing and the domain name parsing address the successful domain name parsing. The domain name available parsing address can be the domain name parsing address capable of accessing the domain name successfully. Based on the domain name available parsing address, the correspondence relationship between the domain name and the domain name available parsing address is established thereby the correspondence between a domain name and an address can be acquired.

In step S54, the domain name parsing request transmitted by the client is acquired, and the domain name parsing request includes the domain name and the home information of the client.

In step S55, the correspondence between a domain name and an address corresponding to the region to which the client belongs is inquired in the pre-stored statistical information, based on the home information.

In step S56, the domain name parsing address corresponding to the domain name included in the inquiring request is determined based on the correspondence between a domain name and an address corresponding to the region.

In some embodiments of the present disclosure, the server can ensure the timeliness of the domain name available parsing address corresponding to the domain name, which is stored in the server, based on the report information acquired within the designated period. A predetermined number of acquired domain name available parsing addresses are determined as the domain name parsing address corresponding to the domain name included in the inquiring request according to the ascending order of time consuming, which can further increase the efficiency of the domain name parsing. Further, the domain name parsing request transmitted by the client is acquired based on the private encryption protocol between the server and the client, so as to ensure the accuracy and security of the reported information.

Figure 6:
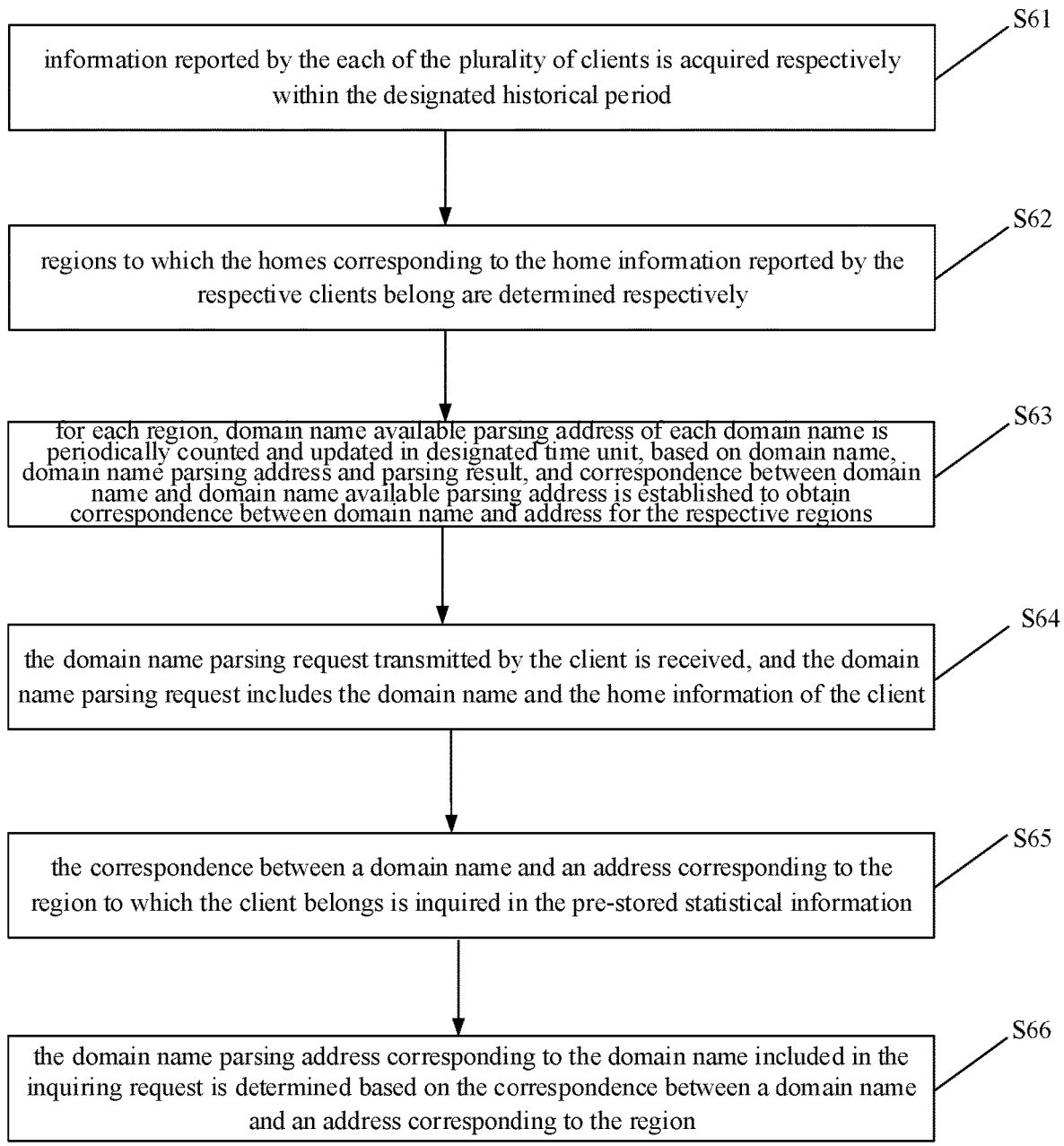
FIG. 6 is a flowchart illustrating a domain name parsing method, according to some embodiments.

FIG. 6 is the flowchart illustrating a domain name parsing method, according to some embodiments. As illustrated in FIG. 6, the domain name parsing method is applied to the server and includes following steps.

In step S61, information reported by the each of the plurality of clients is acquired respectively within the designated historical period.

In step S62, regions to which the homes corresponding to the home information reported by the respective clients belong are determined respectively.

In step S63, for the each region, the domain name available parsing address of each domain name is periodically counted and updated in a designated time unit, based on the domain name, the domain name parsing address and the parsing result, and the correspondence between a domain name and a domain name available parsing address is established to obtain the correspondence between a domain name and an address for the respective regions.

In a possible implementation, the domain name available parsing address of the each region is counted periodically and updated in the designated time unit, in some embodiments of the present disclosure, and thus the latest correspondence between the domain name and the domain name available parsing address can be obtained in real time, which ensures the timeliness and correctness of the domain name available parsing address.

In some embodiments of the present disclosure, the designated time unit can be set based on the actual requirements. For example, it can be one day, one hour or one minute. In some embodiments of the present disclosure, the designated time unit can be set as one minute, for example, in order to ensure the timeliness and correctness of the domain name available parsing address.

In step S64, the domain name parsing request transmitted by the client is received, and the domain name parsing request includes the domain name and the home information of the client.

In step S65, the correspondence between a domain name and an address corresponding to the region to which the client belongs is inquired in the pre-stored statistical information.

In step S66, the domain name parsing address corresponding to the domain name included in the inquiring request is determined, based on the correspondence between a domain name and an address corresponding to the region.

In some embodiments of the present disclosure, the server can ensure the timeliness and effectiveness of the correspondence between a domain name and an address counted previously for the respective regions, which is pre-stored in the server, by counting periodically and updating the domain name available parsing address for the each region in the designated time unit, and can increase the success rate of the domain name parsing by parsing the domain name based on the updated correspondence between a domain name and an address pre-stored in the server.

Figure 7:
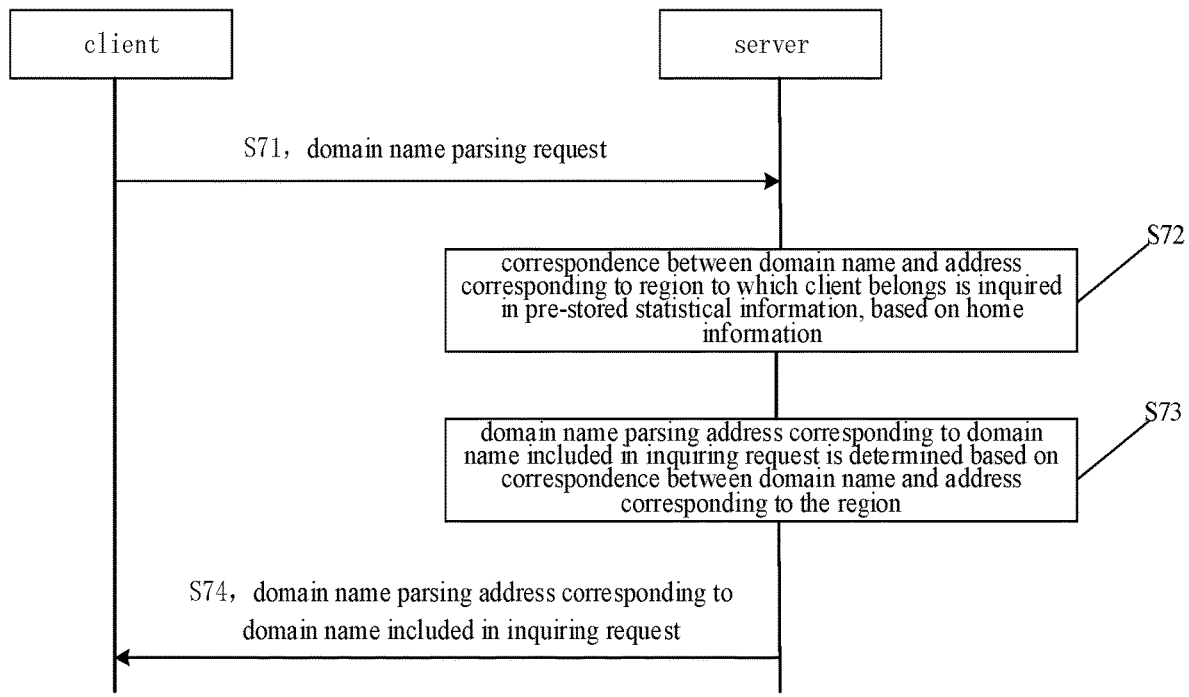
FIG. 7 is a flowchart illustrating a domain name parsing method, according to some embodiments.

FIG. 7 is the flowchart illustrating a domain name parsing method, according to some embodiments. As illustrated in FIG. 7, the domain name parsing method includes following steps.

In step S71, the domain name parsing request including the domain name and the home information of the client is transmitted by the client. The domain name parsing request transmitted by the client is acquired by the server, and the domain name parsing request includes the domain name and the home information of the client.

In step S72, the correspondence between a domain name and an address corresponding to the region to which the client belongs is inquired by the server in the pre-stored statistical information, based on the home information.

In step S73, the domain name parsing address corresponding to the domain name included in the inquiring request is determined by the server based on the correspondence between a domain name and an address corresponding to the region.

In step S74, the domain name parsing address corresponding to the domain name included in the inquiring request is transmitted by the server. The domain name parsing address corresponding to the domain name transmitted by the server is received by the client, and the domain name parsing address is determined by the server based on the home information, the domain name and the pre-stored statistical information.

In some embodiments of the present disclosure, the client transmits the domain name parsing request to the server, and the server parses the domain name transmitted by the client according to the pre-stored correspondence between a domain name and an address counted previously for various regions and transmits the parsed domain name parsing address to the client. The correspondence between a domain name and an address pre-stored in the server represents the corresponding relationship between the domain name and the domain name available parsing address which is a domain name parsing address capable of assessing the domain name successfully. The domain name parsing address, transmitted by the server, corresponding to the domain name is received by the client, which can reduce intermediate links of the domain name parsing and increase the efficiency of the domain name parsing.

Figure 8:
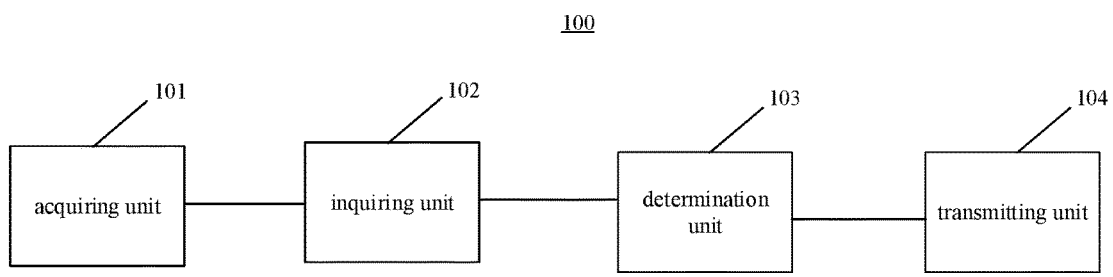
FIG. 8 is a block diagram illustrating a domain name parsing apparatus, according to some embodiments.

FIG. 8 is a block diagram illustrating a domain name parsing apparatus 100, according to some embodiments. Referring to FIG. 8, the domain name parsing apparatus 100 is applied to the server, and includes an acquiring unit 101, an inquiring unit 102, a determination unit 103 and a transmitting unit 104.

The acquiring unit 101 is configured to acquire the domain name parsing request transmitted by the client, the domain name parsing request includes a domain name and home information of the client. The inquiring unit 102 is configured to, based on the home information, inquire the correspondence between a domain name and an address corresponding to the region to which the client belongs in the pre-stored statistical information. The statistical information includes the correspondence between a domain name and an address counted previously for various regions, the correspondence between a domain name and an address represents the corresponding relationship between the domain name and the domain name available parsing address which is the domain name parsing address determined based on the history report information from the plurality of clients and capable of assessing the domain name successfully. The determination unit 103 is configured to, based on the correspondence between a domain name and an address corresponding to the region, determine the domain name parsing address corresponding to the domain name included in the inquiring request. The transmitting unit 104 is configured to transmit the domain name parsing address corresponding to the domain name included in the inquiring request.

In an example, the acquiring unit 101 is further configured to: acquire information reported by each of the plurality of clients respectively within the designated historical period, the information including the home information, the domain name, the domain name parsing address and the parsing result representing the result of whether assessing of the domain name based on the domain name parsing address is successful or not. The determination unit 103 determines the statistical information previously by adopting the following modes: determining, respectively, the regions belonging to homes corresponding to the home information reported by the respective clients. For each region, the domain name available parsing address is counted for the each domain name based on the domain name, the domain name parsing address and the parsing result, and the corresponding relationship between the domain name and the domain name parsing address is established to obtain the correspondences between a domain name and an address for the various regions.

In an example, the determination unit 103 counts the domain name available parsing address for each domain name by adopting the following modes: counting periodically and updating the domain name available parsing address for the each domain name in the designated time unit.

In an example, the domain name available parsing address is the domain name parsing address capable of accessing the domain name successfully and the access time being less than a predetermined time threshold when accessing the domain name.

In an example, the determination unit 103 is configured to determine the domain name parsing address corresponding to the domain name included in the inquiring request by adopting the following mode: based on the correspondence between a domain name and an address corresponding to the region, determining a predetermined number of acquired domain name available parsing addresses as the domain name parsing address corresponding to the domain name included in the inquiring request in an ascending order of time consuming.

In an example, the acquiring unit 101 is configured to acquire the information reported by each of the plurality of clients respectively by adopting the following mode: acquiring, respectively, the information reported by each of the plurality of clients, based on private encryption protocols between the server and each of the plurality of clients.

In an example, the acquiring unit 101 is configured to acquire the domain name parsing request transmitted by the client by adopting the following mode: acquiring the domain name parsing request transmitted by the client based on the private encryption protocol corresponding to the client transmitting the domain name parsing request.

Figure 9:
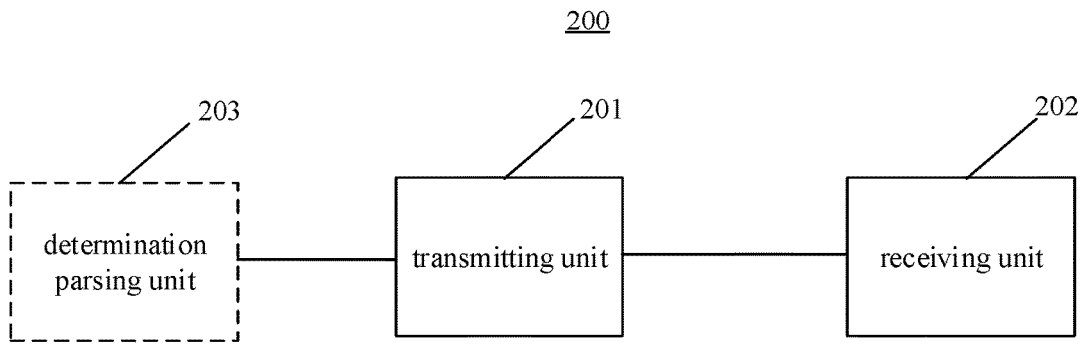
FIG. 9 is a block diagram illustrating a domain name parsing apparatus, according to some embodiments.

FIG. 9 is a block diagram illustrating a domain name parsing apparatus 200, according to some embodiments. Referring to FIG. 9, the domain name parsing apparatus 200 is applied to the client and includes a transmitting unit 201 and a receiving unit 202.

The transmitting unit 201 is configured to transmit the domain name parsing request including the domain name and home information of the client. The receiving unit 202 is configured to receive the domain name parsing address corresponding to the domain name transmitted by the server, and the domain name parsing address is determined by the server based on the home information, the domain name and pre-stored statistical information. The statistical information includes the correspondence between a domain name and an address counted previously for various regions, the correspondence between a domain name and an address represents the corresponding relationship between the domain name and the domain name available parsing address which is the domain name parsing address determined based on history report information from the plurality of clients and capable of assessing the domain name successfully.

In an example, the domain name parsing apparatus further includes: a determination parsing unit 203, configured to determine that the domain name parsing is failed on the local DNS server, before transmitting the domain name parsing request.

In an example, the domain name parsing apparatus further includes: a report unit configured to report, in real time, information including the home information, the domain name, the domain name parsing address, and the parsing result representing whether accessing of the domain name based on the domain name parsing address is successful or not.

In an example, the transmitting unit 201 is configured to transmit the domain name parsing request by adopting the following mode: transmitting the domain name parsing request based on the private encryption protocol between the client and the server.

In an example, the reporting unit is configured to report information by adopting the following mode: reporting information based on a private encryption protocol between the client and the server.

With respect to the apparatus in the above embodiments, the specific manners for performing operations by individual modules therein have been described in detail in the embodiments regarding the methods, which will not be elaborated herein.

Figure 10:
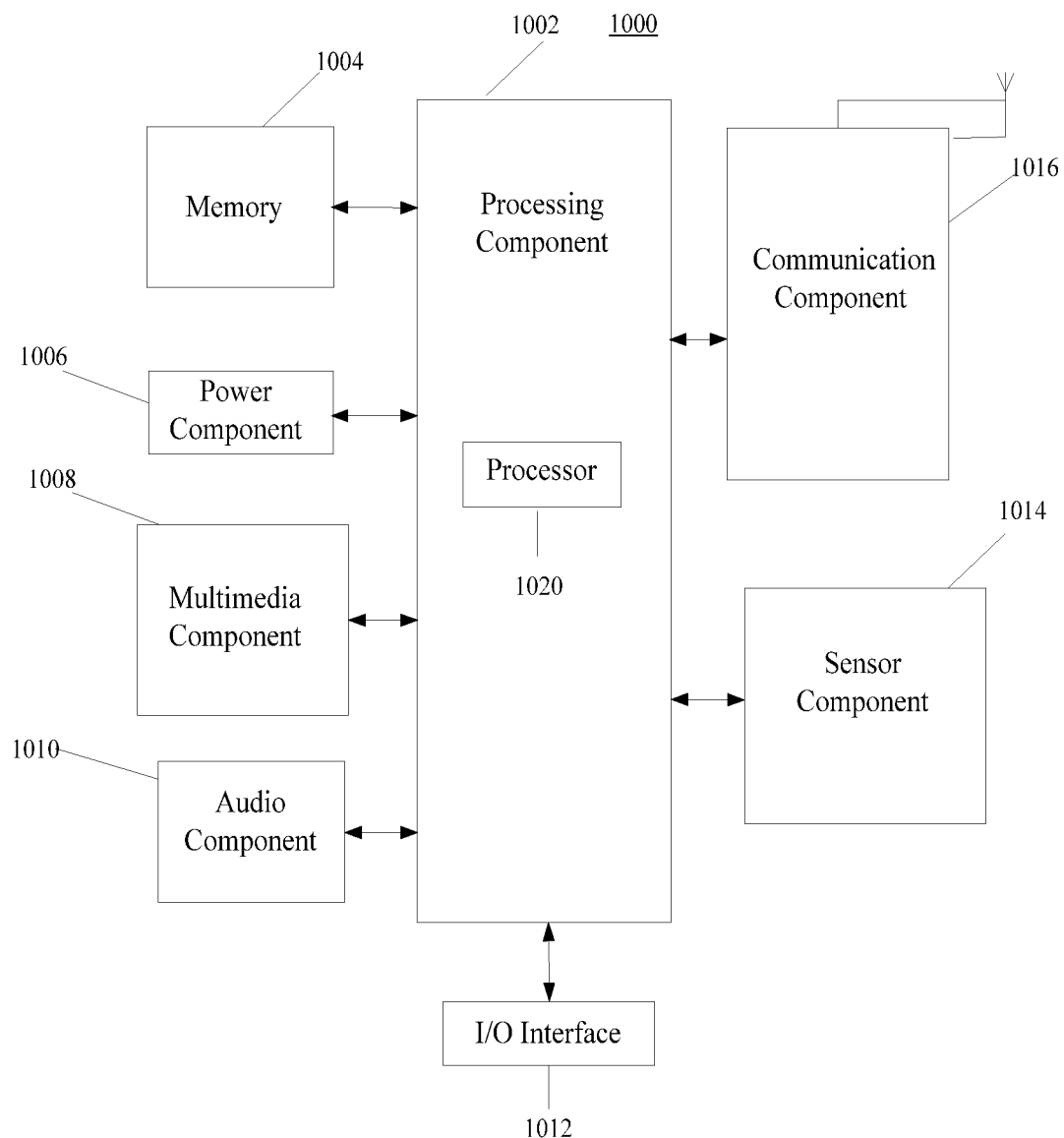
FIG. 10 is a block diagram of a device, according to some embodiments.

FIG. 10 is a block diagram of a device 1000 for parsing the domain name, according to some embodiments. For example, the device 1000 can be a mobile phone, a computer, a digital broadcast terminal, a messaging device, a gaming console, a tablet, a medical device, exercise equipment, a personal digital assistant, and the like.

Referring to FIG. 10, the device 1000 can include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 can include one or more processors 1020 to execute instructions to perform all or part of the steps in the above described methods. Moreover, the processing component 1002 can include one or more modules which facilitate the interaction between the processing component 1002 and other components. For instance, the processing component 1002 can include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 can include a power management system, one or more power sources, and any other components associated with the generation, management, and distribution of power in the device 1000.

The multimedia component 1008 includes a screen providing an output interface between the device 1000 and the user. In some embodiments, the screen can include a liquid crystal display (LCD) and a touch panel (TP). In some embodiments, organic light-emitting diode (OLED) or other types of displays can be employed.

If the display screen includes the touch panel, the screen can be implemented as a touch screen to receive input signals from the user. The touch panel includes one or more touch sensors to sense touches, swipes, and gestures on the touch panel. The touch sensors not only can sense a boundary of a touch or swipe action, but also sense a period of time and a pressure associated with the touch or swipe action. In some embodiments, the multimedia component 1008 includes a front camera and/or a rear camera. The front camera and the rear camera can receive an external multimedia datum while the device 1000 is in an operation mode, such as a photographing mode or a video mode. Each of the front camera and the rear camera can be a fixed optical lens system or have focus and optical zoom capability.

The display screen of the mobile terminal such as the mobile phone can display the received domain name parsing address and/or webpage content corresponding to the domain name parsing address to a user.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal can be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons can include, but are not limited to, a home button, a volume button, a starting button, and a locking button.

The sensor component 1014 includes one or more sensors to provide status assessments of various aspects of the device 1000. For instance, the sensor component 1014 can detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 can include a proximity sensor configured to detect the presence of nearby objects without any physical contact. The sensor component 1014 can also include a light sensor, such as a CMOS or CCD image sensor, for use in imaging applications. In some embodiments, the sensor component 1014 can also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as Wi-Fi, 2G, 3G, 4G, 5G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 1004 including instructions, executable by the processor 1020 in the device 1000, for performing the above-described methods. For example, the non-transitory computer-readable storage medium can be a ROM, a RAM, a CD-ROM, a magnetic tape, a floppy disc, an optical data storage device, and the like.

Various embodiments of the present disclosure can have one or more of the following advantages.

The client transmits the domain name parsing request to the server, and the server parses the domain name transmitted by the client according to a correspondence between a domain name and an address, which is pre-stored and counted previously for various regions, and transmits the domain name parsing address to the client. The correspondence between a domain name and an address pre-stored in the server represents the corresponding relationship between the domain name and the domain name available parsing address which is a domain name parsing address capable of assessing the domain name successfully. The domain name parsing address, transmitted by the server, corresponding to the domain name is received by the client, which can reduce intermediate links of the domain name parsing and increase an efficiency of the domain name parsing.

The various device components, modules, units, blocks, or portions may have modular configurations, or are composed of discrete components, but nonetheless can be referred to as "modules" or "units" in general. In other words, the "components," "modules," "blocks," "portions," or "units" referred to herein may or may not be in modular forms.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A domain name parsing method, applied to a server, comprising:
    acquiring a domain name parsing request transmitted by a client, the domain name parsing request including a domain name and home information of the client;
    inquiring a correspondence relationship between the domain name and an address corresponding to a region to which the client belongs in pre-stored statistical information;
    the pre-stored statistical information including correspondence relationships between domain names and addresses previously obtained from historical data for each region, the addresses including a domain name available parsing address determined based on historical report information from a plurality of clients, wherein the domain name available parsing address historically allows accessing the domain name successfully; and
    determining and transmitting the available domain name parsing address corresponding to the domain name included in the domain name parsing request, based on the inquired correspondence relationship between the domain name and the address corresponding to the region.

2. The domain name parsing method of claim 1, wherein the domain name parsing method further comprises determining the statistical information previously by adopting following modes:
    acquiring respectively information reported by each of the plurality of clients within a designated historical period, the information including the home information, the domain name, the domain name parsing address and a parsing result representing whether assessing of the domain name based on the domain name parsing address is successful;
    determining respectively the region to which the home corresponding to the home information reported by the each of the plurality of clients belong;
    counting the domain name available parsing addresses for each domain name, based on the domain name, the domain name parsing address and the parsing result, for each region; and
    establishing the correspondence relationship between the domain name and the domain name parsing address to obtain the correspondence relationship between the domain name and the address for the each region.

3. The domain name parsing method of claim 2, wherein the counting the domain name available parsing addresses for each domain name comprises:
    counting periodically on and updating the domain name available parsing addresses for the each domain name in a designated time unit.

4. The domain name parsing method of claim 1, wherein the domain name available parsing address is a domain name parsing address having an access time less than a predetermined time threshold when accessing the domain name.

5. The domain name parsing method of claim 4, wherein the determining the domain name parsing address corresponding to the domain name included in the domain name parsing request based on the correspondence between the domain name and the address corresponding to the region comprises:

determining a predetermined number of the domain name available parsing addresses, in an ascending order of time consuming, as the domain name parsing addresses corresponding to the domain names included in the domain name parsing request.

6. A domain name parsing method, applied to a client, comprising:
   transmitting, to a server, a domain name parsing request including a domain name and home information of the client;
   receiving a domain name parsing address corresponding to the domain name from the server, the domain name parsing address being determined by the server based on the home information, the domain name and pre-stored statistical information; and
   the pre-stored statistical information including correspondence relationships between domain names and addresses previously obtained from historical data for each region, the addresses including a domain name available parsing address determined based on historical report information from a plurality of clients, wherein the domain name available parsing address historically allows accessing the domain name successfully.

7. The domain name parsing method of claim 6, wherein the method further comprises:
   reporting information in real time, the information including the home information, the domain name, the domain name parsing address and a parsing result representing whether accessing of the domain name based on the domain name parsing address is successful.

8. A domain name parsing apparatus configured to perform the domain name parsing method of claim 1, the domain name parsing apparatus comprising:
   a processor;
   memory storing processor-executable instructions;
   wherein the processor is configured to perform steps of the domain name parsing method.

9. A non-transitory computer-readable storage medium having computer executable instructions stored thereon, for execution by a processor to implement the domain name parsing method of claim 1.

10. A domain name parsing apparatus configured to perform the method of claim 6, the apparatus comprising:
   a processor;
   memory storing processor-executable instructions;
   wherein the processor is configured to perform steps of the domain name parsing method.

11. A domain name parsing system, comprising a server including the domain name parsing apparatus according to claim 8 and a plurality of clients, wherein the server is configured to transmit the domain name parsing address corresponding to the domain name to the client, to thereby reduce intermediate links of domain name parsing and increase efficiency of the domain name parsing.

12. The domain name parsing system of claim 11, wherein the client is configured to:
   transmit the domain name parsing request including the domain name and home information of the client; and
   receive the domain name parsing address corresponding to the domain name transmitted by the server, the domain name parsing address being determined by the server based on the home information, the domain name and pre-stored statistical information;
   wherein:
   the pre-stored statistical information includes correspondence relationships between domain names and addresses previously obtained from historical data for each region; and
   the addresses includes a domain name available parsing address determined based on historical report information from a plurality of clients, wherein the domain name available parsing address historically allows assessing the domain name successfully.

* * * * *